United States Patent
Luo

(10) Patent No.: US 8,874,168 B2
(45) Date of Patent: Oct. 28, 2014

(54) METHOD AND SYSTEM FOR UTILIZING A SINGLE SIM CARD SOCKET TO SUPPORT MULTIPLE SIM CARDS IN A MULTI-SIM MULTI-STANDBY COMMUNICATION DEVICE

(75) Inventor: Hui Luo, Marlboro, NJ (US)

(73) Assignee: Broadcom Corporation, Irvine, CA (US)

(*) Notice: Subject to any disclaimer, the term of this patent is extended or adjusted under 35 U.S.C. 154(b) by 397 days.

(21) Appl. No.: 12/819,039

(22) Filed: Jun. 18, 2010

(65) Prior Publication Data

US 2011/0117964 A1     May 19, 2011

Related U.S. Application Data

(60) Provisional application No. 61/261,922, filed on Nov. 17, 2009.

(51) Int. Cl.
*H04B 1/38*        (2006.01)
*H04W 48/18*    (2009.01)
*H04W 88/06*    (2009.01)

(52) U.S. Cl.
CPC ............. *H04W 48/18* (2013.01); *H04W 88/06* (2013.01)
USPC ................... 455/558; 455/435.2; 455/552.1; 455/557

(58) Field of Classification Search
CPC .... H04W 88/02; H04W 48/18; H04B 1/3816; H04M 1/72527; H04M 1150/14
USPC .......... 455/558, 425, 432.2, 433, 435.1, 514, 455/550.1, 552.1, 554.2, 556.1, 557, 559
See application file for complete search history.

(56) References Cited

U.S. PATENT DOCUMENTS

| | | | |
|---|---|---|---|
| 6,799,155 B1* | 9/2004 | Lindemann et al. | 703/24 |
| 8,170,614 B2* | 5/2012 | Kim | 455/558 |
| 8,369,895 B2* | 2/2013 | Lee et al. | 455/558 |
| 2002/0103009 A1* | 8/2002 | Sato | 455/558 |
| 2003/0153356 A1* | 8/2003 | Liu | 455/558 |
| 2005/0153740 A1* | 7/2005 | Binzel et al. | 455/558 |
| 2006/0105810 A1* | 5/2006 | Gnuschke | 455/558 |
| 2009/0061934 A1* | 3/2009 | Hauck et al. | 455/558 |
| 2009/0088211 A1* | 4/2009 | Kim | 455/558 |
| 2009/0212908 A1* | 8/2009 | Lin et al. | 340/5.81 |
| 2010/0029331 A1* | 2/2010 | Gnuschke | 455/558 |
| 2010/0041438 A1* | 2/2010 | Brown | 455/558 |
| 2010/0105433 A1* | 4/2010 | Lin et al. | 455/558 |
| 2010/0311467 A1* | 12/2010 | Wu | 455/558 |

(Continued)

*Primary Examiner* — Magdi Elhag
(74) *Attorney, Agent, or Firm* — Sterne, Kessler, Goldstein & Fox P.L.L.C.

(57) ABSTRACT

A multiple-subscriber identity module (multi-SIM) multi-standby communication device comprises a single SIM card socket that handles multiple SIM cards each with a unique SIM clock signal. SIM identification information is acquired from each SIM card utilizing corresponding SIM clock signals. The SIM clock signals may be generated in response to corresponding SIM card selections and are assigned to corresponding SIM cards, respectively. Each of the assigned SIM clock signals is signaled to the single SIM card socket at a different time instant to establish connections between the multi-SIM multi-standby communication device and each of the multiple SIM cards, respectively. SIM identification information is received from each SIM card. The received SIM identification information is stored within the multi-SIM multi-standby communication device for concurrently communication with corresponding communication networks. No device re-booting is performed while activating the stored SIM identification information from one to another of the multiple SIM cards.

20 Claims, 5 Drawing Sheets

(56) References Cited

U.S. PATENT DOCUMENTS

| | | | |
|---|---|---|---|
| 2011/0117963 A1* | 5/2011 | Wang et al. | 455/558 |
| 2011/0117964 A1* | 5/2011 | Luo | 455/558 |
| 2011/0195749 A1* | 8/2011 | Lan | 455/558 |
| 2012/0115546 A1* | 5/2012 | Lin et al. | 455/558 |
| 2012/0270602 A1* | 10/2012 | Card | 455/558 |

* cited by examiner

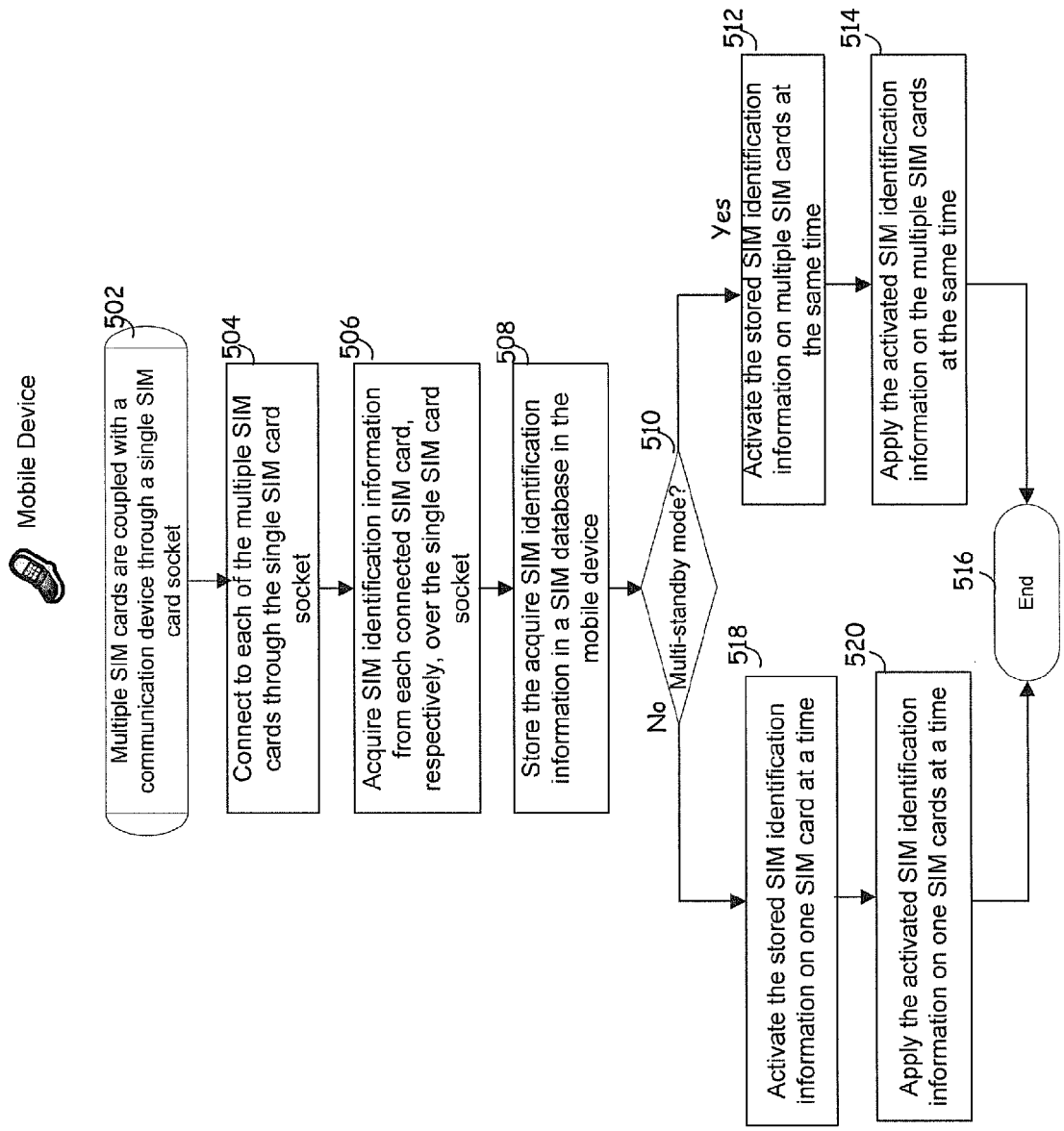

METHOD AND SYSTEM FOR UTILIZING A SINGLE SIM CARD SOCKET TO SUPPORT MULTIPLE SIM CARDS IN A MULTI-SIM MULTI-STANDBY COMMUNICATION DEVICE

CROSS-REFERENCE TO RELATED APPLICATIONS/INCORPORATION BY REFERENCE

This patent application makes reference to, claims priority to and claims the benefit from U.S. Provisional Patent Application Ser. No. 61/261,922 filed on Nov. 17, 2009.

This application makes reference to:
U.S. application Ser. No. 12/816,782 filed on Jun. 16, 2010,
U.S. application Ser. No. 12/816,835 filed on Jun. 16, 2010,
U.S. application Ser. No. 12/821,673 filed on Jun. 23, 2010, and
U.S. application Ser. No. 12/819,014 filed on Jun. 18, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for utilizing a single SIM card socket to support multiple SIM cards in a multi-SIM multi-standby communication device.

BACKGROUND OF THE INVENTION

With the development of mobile communication systems, mobile devices may utilize various mobile communication techniques such as, for example, global system for mobile communications (GSM), Universal Mobile Telecommunications System (UMTS), Long Term Evolution (LTE) network and wireless local area network (WLAN) to receive desired services. In instances where a mobile device subscribes to a communication network, subscriber information may be required to identify the mobile device to the network for various network services such as authentication, accounting, billing and security services. The subscriber information may be stored in a subscriber identity module (SIM) card inserted in the mobile device. A SIM card is a card or a chip installed in the mobile device providing information to identify the subscriber carrying the mobile device to networks.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for utilizing a single SIM card socket to support multiple SIM cards in a multi-SIM multi-standby communication device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 5 is a flow chart illustrating exemplary steps for communicating by a multi-SIM multi-standby communication device that comprises a single SIM card socket that couples a plurality of SIM cards, in accordance with an embodiment of the invention.

DETAILED DESCRIPTION OF THE INVENTION

Certain embodiments of the invention may be found in a method and system for utilizing a single SIM card socket to support multiple SIM cards in a multi-SIM multi-standby communication device. In various embodiments of the invention, a multiple-subscriber identity module (multi-SIM) multi-standby communication device comprises a single SIM card socket that handles a plurality of SIM cards. Each of the plurality of SIM cards is associated with a unique SIM clock signal. The multi-SIM multi-standby communication device may be operable to acquire SIM identification information from each of the plurality of SIM cards utilizing corresponding associated SIM clock signals. The acquired SIM identification information may be utilized by the multi-SIM multi-standby communication device to communicate with one or more communication networks such as a LTE network and a GSM network for various network services such as operation, maintenance, provisioning, administrating, accounting and/or billing services. The plurality of SIM cards may be selected based on user preferences and/or device configuration. The multi-SIM multi-standby communication device may be operable to generate each of the associated SIM clock signals in response to the SIM card selection. The generated SIM clock signals may be assigned to each of the plurality of SIM cards, respectively. The multi-SIM multi-standby communication device may communicate with the single SIM card socket using each of assigned SIM clock signals at a different time instant. The single SIM card socket may be operable to detect SIM clock signals communicated from the multi-SIM multi-standby communication device in order to connect with each of the plurality of SIM cards, respectively. The multi-SIM multi-standby communication device may receive SIM identification information from each SIM card whenever each of the plurality of SIM cards is communicatively coupled to the single SIM card socket. The received SIM identification information may be stored within the multi-SIM multi-standby communication device where it may be utilized for concurrently communicating with a plurality of communication networks. No device rebooting is required during SIM card switching on the multi-SIM multi-standby communication device.

Figure 1:
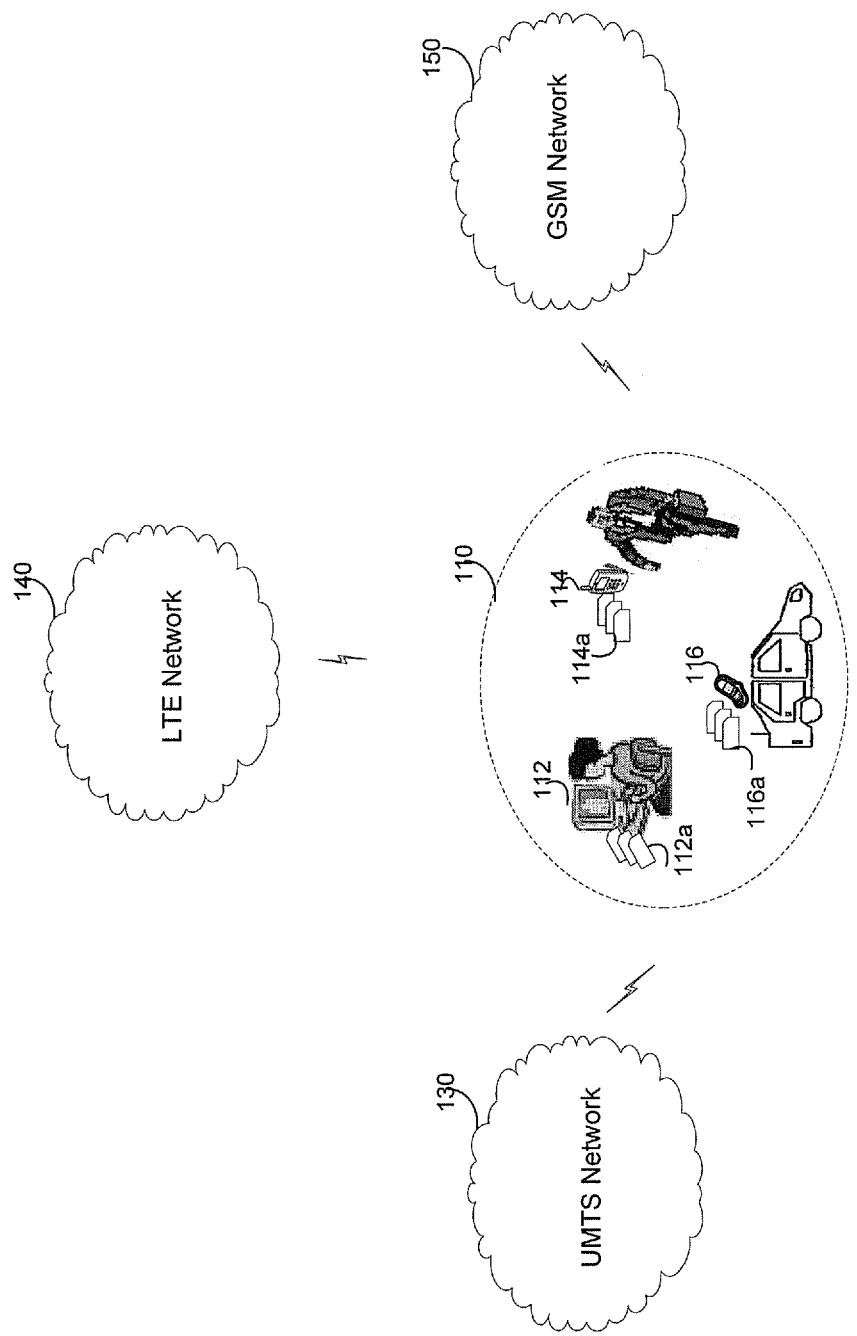
FIG. 1 is a diagram illustrating an exemplary communication system that is operable to utilize a single SIM card socket to connect multiple SIM cards in a multi-SIM multi-standby communication device, in accordance with an embodiment of the invention.

FIG. 1 is a diagram illustrating an exemplary communication system that is operable to utilize a single SIM card socket to connect multiple SIM cards in a multi-SIM multi-standby communication device, in accordance with an embodiment of the invention. Referring to FIG. 1, there is shown a communication system 100. The communication system 100 comprises a plurality of mobile devices 110, of which multi-SIM multi-standby communication devices 112-116 are illustrated, a UMTS network 130, a Long Term Evolution (LTE) network 140, and a GSM network 150.

A multi-SIM multi-standby communication device such as the multi-SIM multi-standby communication device 112 may comprise suitable logic, circuitry, interfaces and/or code that are operable to communicate various network services such as authentication, billing and/or security with a plurality of communication access networks such as, for example, the UMTS network 130, the LTE network 140, and the GSM network 150. Multiple SIM cards such as SIM cards 112a may be inserted in the multi-SIM multi-standby communication device 112 whenever needed.

In various exemplary embodiments of the invention, the inserted SIM cards 112a may be connected or coupled with each of the multi-SIM multi-standby communication device 112, respectively, through a single SIM card socket or connection. One or more SIM cards may be selected from the SIM cards 112a base on, for example, user selection and/or network identity. The multi-SIM multi-standby communication device 112 may read or retrieve SIM identification information from each of the selected SIM cards via the single SIM card socket. The retrieved SIM identification information may be stored within the multi-SIM multi-standby communication device 112 to support various network services such as authentication, billing and security whenever needed. In this regard, the multi-SIM multi-standby communication device 112 may be configured to activate the retrieved SIM identification information either on one SIM card at a time or on multiple SIM cards at the same time depending on implementation. In instances where the retrieved SIM identification information is activated on one SIM card at a time, the multi-SIM multi-standby communication device 112 may operate in a single-standby mode. In instances where the retrieved SIM identification information is activated on two or more SIM cards at the same time, the multi-SIM multi-standby communication device 112 may operate in a multi-standby mode. In this regard, the multi-SIM multi-standby communication device 112 in a multi-standby mode may support multiple subscriptions at the same time. A user of the multi-SIM multi-standby communication device 112 may be operable to utilize multiple numbers, multiple different service plans and/or one or more network carriers at the same time whenever the multi-SIM multi-standby communication device 112 is in a multi-standby mode.

In various exemplary embodiments of the invention, the multi-SIM multi-standby communication device 112 may be configured to select a set of different SIM clock signals each assigned one of the SIM cards 112a. In other words, the SIM cards 112a may be distinguished from one another by corresponding assigned SIM clock signals. In this regard, the multi-SIM multi-standby communication device 112 may start running or activating each of the SIM cards 112a by signaling the single SIM card socket with a corresponding assigned SIM clock signal. For example, depending on user preferences and/or device configuration, a single SIM card may be selected from among the SIM cards 112a. The multi-SIM multi-standby communication device 112 may be operable to generate a SIM clock signal assigned to the selected SIM card. The generated SIM clock signal may be signaled or communicated to the single SIM card socket to enable connecting to the selected SIM card. The single SIM card socket may be operable to detect the SIM clock signal generated by the multi-SIM multi-standby communication device 112. A specific SIM card may be selected or determined from the SIM cards 112a based on the detected SIM clock signal. One SIM card may be connected to the multi-SIM multi-standby communication device 112 at any given time instant through the single SIM card socket.

The multi-SIM multi-standby communication device 112 may be operable to switch SIM card from one to another depending on the need. The need may be dictated by exemplary factors comprising user preference, user selection, network availability, network selection, cost, quality of service (QoS), and/or bandwidth availability. The multi-SIM multi-standby communication device 112 may control and manage SIM card switching through the single SIM card socket. In this regard, the multi-SIM multi-standby communication device 112 may perform SIM card switching from one to another without turning the multi-SIM multi-standby communication device 112 on and off. In other words, SIM card switching may be performed without re-booting the multi-SIM multi-standby communication device 112. Switching without rebooting may be referred to as a hot switch of the SIM card. SIM identification information stored in each of the SIM cards 112a may be communicated to the multi-SIM multi-standby communication device 112, respectively, through the single SIM card socket without re-booting the multi-SIM multi-standby communication device 112.

The UMTS network 130 may comprise suitable devices, circuitry, interfaces and/or code that are operable to provide data services to various UMTS capable communication devices such as the multi-SIM multi-standby communication device 112 using UMTS technology. In this regard, the UMTS network 130 may be operable to authenticate users such as the multi-SIM multi-standby communication devices 112-116 for UMTS access utilizing SIM cards. A SIM card for UMTS is also known as universal subscribe identity module (USIM). Only authorized users may access the UMTS network 130. The UMTS network 130 may be operable to check the validity of USIM identification information on one or more USIM cards coupled to, for example, the multi-SIM multi-standby communication device 112. The UMTS network 130 may determine whether the multi-standby communication device 112 is allowed to access the UMTS network 130 for various network services such as, for example, authentication, accounting and/or billing services.

The LTE network 140 may comprise suitable devices, circuitry, interfaces and/or code that are operable to provide data services to various LTE capable communication devices such as the multi-SIM multi-standby communication device 112 using LTE technology. In this regard, the LTE network 140 may be operable to authenticate users such as the multi-SIM multi-standby communication devices 112-116 for LTE access utilizing SIM cards. A SIM card for LTE is also known as Universal Integrated Circuit Card (UICC). Only authorized users may access the LTE network 140. The LTE network 140 may be operable to check the validity of UICC identification information on one or more UICCs coupled to, for example, the multi-SIM multi-standby communication device 112. The LTE network 140 may determine whether the multi-SIM multi-standby communication device 112 is allowed to access the LTE network 140 for various network services such as, for example, authentication, accounting and/or billing services.

The GSM network 150 may comprise suitable devices, circuitry, interfaces and/or code that are operable to provide data services to various GSM capable communication devices such as the multi-SIM multi-standby communication device 112 using GSM technology. In this regard, the GSM network 150 may be operable to authenticate users such as the multi-SIM multi-standby communication devices 112-116 for GSM access utilizing SIM cards. Only authorized users may access the GSM network 150. The GSM network 150 may be operable to check the validity of SIM identification information on one or more SIM cards coupled to, for example, the multi-SIM multi-standby communication device 112. The GSM network 150 may determine whether the multi-SIM multi-standby communication device 112 is allowed to access the GSM network 150 for various network services such as, for example, authentication, accounting and/or billing services.

In an exemplary operation, a multi-SIM multi-standby communication device such as the multi-SIM multi-standby communication device 112 may be connected or coupled with multiple SIM cards such as the SIM cards 112a through a single SIM card socket or connection. A different SIM clock signal may be assigned to one of the multiple SIM cards. SIM identification information on the multiple SIM cards may be utilized on one SIM card at a time and/or on multiple SIM cards at the same time depending on implementation. One or more SIM cards may be selected from the multiple SIM cards according to exemplary factors comprising user preference, user selection, network availability, network selection, cost, quality of service (QoS), bandwidth availability, and/or device capabilities. The multi-SIM multi-standby communication device 112 may be operable to connect to each of the selected SIM cards, respectively, through the single SIM card socket. In this regard, to connect to a selected SIM card, the multi-SIM multi-standby communication device 112 may be operable to generate a SIM clock signal assigned to the selected SIM card. The generated SIM clock signal may be communicated to the single SIM card socket.

The single SIM card socket may be operable to identify the selected SIM card from the multiple SIM cards based on the SIM clock signal from the multi-SIM multi-standby communication device 112. SIM identification information on each of the multiple SIM cards may be communicated to the multi-SIM multi-standby communication device 112 through the single SIM card socket. The multi-SIM multi-standby communication device 112 may manage SIM card switching without re-booting the multi-SIM multi-standby communication device 112. The multi-SIM multi-standby communication device 112 may operate in a single-standby mode or a multi-standby mode depending on device configuration and/or user preferences. A user of the multi-SIM multi-standby communication device 112 in a multi-standby mode may be allowed to utilize multiple numbers, multiple different service plans and/or network carriers at the same time on the multi-SIM multi-standby communication device 112.

Figure 2:
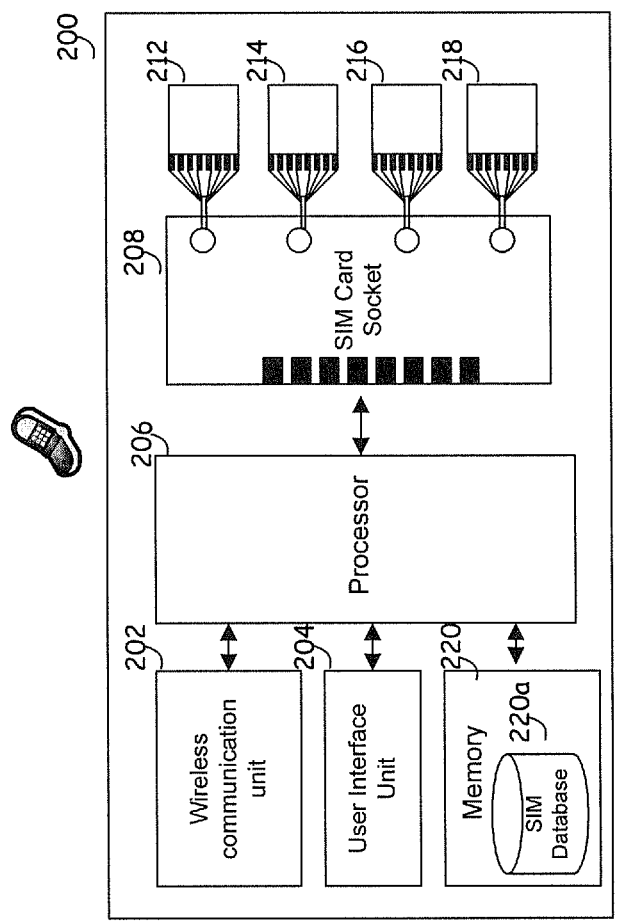
FIG. 2 is a block diagram illustrating an exemplary multi-SIM multi-standby communication device that is connected to multiple SIM cards through a single SIM card socket, in accordance with an embodiment of the invention.

FIG. 2 is a block diagram illustrating an exemplary multi-SIM multi-standby communication device that is connected to multiple SIM cards through a single SIM card socket, in accordance with an embodiment of the invention. Referring to FIG. 2, there is shown a multi-SIM multi-standby communication device 200. The multi-SIM multi-standby communication device 200 comprises a wireless communication unit 202, a user interface unit 204, a processor 206, a SIM card socket 208, a plurality of SIM cards, of which SIM cards 212-218 are illustrated, and a memory 220. The SIM cards 212-218 are coupled to the multi-SIM multi-standby communication device 200 through a single SIM card socket such as the SIM card socket 208. The memory 220 comprises a SIM database 220a.

The wireless communication unit 202 may comprise suitable logic, circuitry, interfaces and/or code that may be operable to communicate radio frequency signals with various communication networks such as, for example, the LTE network 140 and the GSM network 150. SIM identification information that is retrieved from the SIM cards 212-218 may be communicated via the wireless communication unit 202 to identify the multi-SIM multi-standby communication device 200 to network for desired services such as accounting/billing services.

The user interface unit 204 may comprise suitable logic, circuitry, interfaces and/or code that may enable a user to interact with the multi-SIM multi-standby communication device 200. For example, the user interface unit 204 may be operable to present the user with information on SIM cards available to the multi-SIM multi-standby communication device 200. The user interface unit 204 may allow the user to enter a preferred SIM card selection.

the processor 206 may comprise suitable logic, circuitry, and interfaces and/or code that may be operable to manage and/or control operations of associated device components such as, for example, the wireless communication unit 202, the user interface unit 204, the SIM database 208a, and/or the SIM card socket 208. For example, the processor 206 may be operable to coordinate and/or control operations of the SIM card socket 208 in response to a SIM card selection from the user interface unit 204. In various exemplary embodiments of the invention, the processor 206 may be operable to select one of a plurality of SIM clock signals to handle a corresponding one of the SIM cards 212-218. One or more SIM cards may be selected based on user preferences and/or device configuration. The processor 206 may generate SIM clock signals corresponding to the selected one or more SIM cards. Each of the generated SIM clock signals may be signaled or communicated to the SIM card socket 208 at a different time instant so that the selected one or more SIM cards may be connected to the SIM card socket 210 and thereby to the processor 206, respectively. Only one of the selected SIM cards may be actively connected to the SIM card socket 210 at a given time instant to enable downloading of the corresponding SIM identification information into the SIM database 220a of the multi-SIM multi-standby communication device 200. Notwithstanding, in accordance with various embodiments of the invention, after SIM identification information is downloaded from each of the plurality of SIM cards into the SIM database 220a of the multi-SIM multi-standby communication device 200, the SIM identification information corresponding to one or more of the plurality of SIM cards may be in an active state or in a standby state in the SIM database 220a. More specifically, at a given time instant, SIM identification information actually being utilized or applied by the multi-SIM multi-standby communication device 200 is in an active state, otherwise, in a standby state.

The processor 206 may read or retrieve SIM identification information from each of the selected one or more SIM cards via the SIM card socket 208. The retrieved SIM identification information may be stored in the SIM database 220a. In instances where the multi-SIM multi-standby communication device 200 is configured to operate in a single-standby mode, the processor 206 may communicate with the SIM database 220a to activate the stored SIM identification information corresponding to one SIM card at a time. In other words, the multi-SIM multi-standby communication device 200, in a single-standby mode, may be operable to utilize SIM identification information activated for a single SIM card at a time. In instances where the multi-SIM multi-standby communication device 200 is configured to operate in a multi-standby mode, the processor 206 may be operable to communicate with the SIM database 220a to activate the stored SIM identification information corresponding to multiple SIM cards at the same time. Specifically, the multi-SIM multistandby communication device 200, in a multi-standby mode, may be operable to utilize SIM identification information activated for multiple SIM cards at the same time. In this regard, no device re-booting is performed while activating the stored SIM identification information from one to another of the multiple SIM cards. in addition, the processor 206 may be operable to utilize a common SIM protocol for communications with different SIM cards such as the SIM cards 212-218 through the SIM card socket 208.

The SIM card socket 208 may comprise suitable logic, circuitry, interfaces and/or code that may be operable to provide a single connection from multiple SIM cards such as the SIM cards 212-218 to the processor 206. In this regard, the SIM card socket 208 may connect the SIM cards 212-218, respectively. In this regard, the SIM card socket 208 may be operable to detect a SIM clock signal that may be generated utilizing, for example, the processor 206. The SIM card socket 208 may determine a specific SIM card such as the SIM card 214 based on the detected SIM clock signal. The SIM card socket 208 may be operable to establish and activate a connection between the SIM card 214 and the processor 206. The single SIM card socket 208 may be configured to maintain SIM card switching from one to another as needed without re-booting the multi-SIM multi-standby communication device 200.

A SIM card such as the SIM card 214 may comprise suitable logic, circuitry, interfaces and/or code that may be operable to store subscriber personal identification information such as, for example, operator network, phone number, activated services, billing, and credit information. The SIM card 214 may also store the user's identity for gaining access to the network and receiving calls, and user's personal information such as phone directory and received SMS messages. The SIM card 214 may be implemented as a small printed circuit board. The SIM card 214 may be inserted in a mobile device such as the multi-SIM multi-standby communication device 200 in order for the multi-SIM multi-standby communication device 200 to properly access a corresponding network. The SIM card 214 may be connected to the multi-SIM multi-standby communication device 200 via the SIM card socket 210 and thereby to the processor 206.

The memory 220 may comprise suitable logic, circuitry, interfaces and/or code that may be operable to store information such as executable instructions and data that may be utilized by the processor 206 and/or other device components such as, for example, the SIM database 220a. The SIM database 220a may comprise suitable logic, circuitry, interfaces and/or code that may be operable to record and/or store SIM identification information retrieved from one or more SIM cards. The stored SIM identification information may be in an active state or in a standby state within the SIM database 220a. For a given time instant, only SIM identification information in an active state may be actually utilized by the multi-SIM multi-standby communication device 200 to support desired network services such as accounting/billing services. Depending on device configuration, for a given time instant, SIM identification information in an active state may correspond to one or more SIM cards. The memory 220 may comprise RAM, ROM, low latency nonvolatile memory such as flash memory and/or other suitable electronic data storage.

In an exemplary operation, a multi-SIM multi-standby communication device such as the multi-SIM multi-standby communication device 200 may be connected or coupled to multiple SIM cards such as the SIM cards 212-218 through the single SIM card socket 210. A different SIM clock signal may be assigned by the processor 206 to select and handle each of the SIM cards 212-218, respectively. One or more SIM cards may be selected according to user preferences and/or device configuration. In instances where a SIM card such as the SIM card 214 is selected through the user interface unit 204, the processor 206 may be operable to generate a SIM clock signal corresponding to the SIM card 214. The generated SIM clock signal for the SIM card 214 may be communicated to the SIM card socket 210. The SIM card socket 210 may be operable to determine a SIM card such as the SIM card 214 based on a SIM clock signal detected from the processor 206. The SIM card 214 may then be connected to the SIM card socket 210 and thereby to the processor 206. The processor 206 may be operable to retrieve SIM identification information from the SIM card 214. The retrieved SIM identification information may be stored in the SIM database 220a. SIM identification information in the SIM database 220a may be activated to identify the multi-SIM multi-standby communication device 200 to one or more networks for desired services such as accounting/billing services. In this regard, no device re-booting is performed while activating the stored SIM identification information from one to another of the multiple SIM cards.

Figure 3:
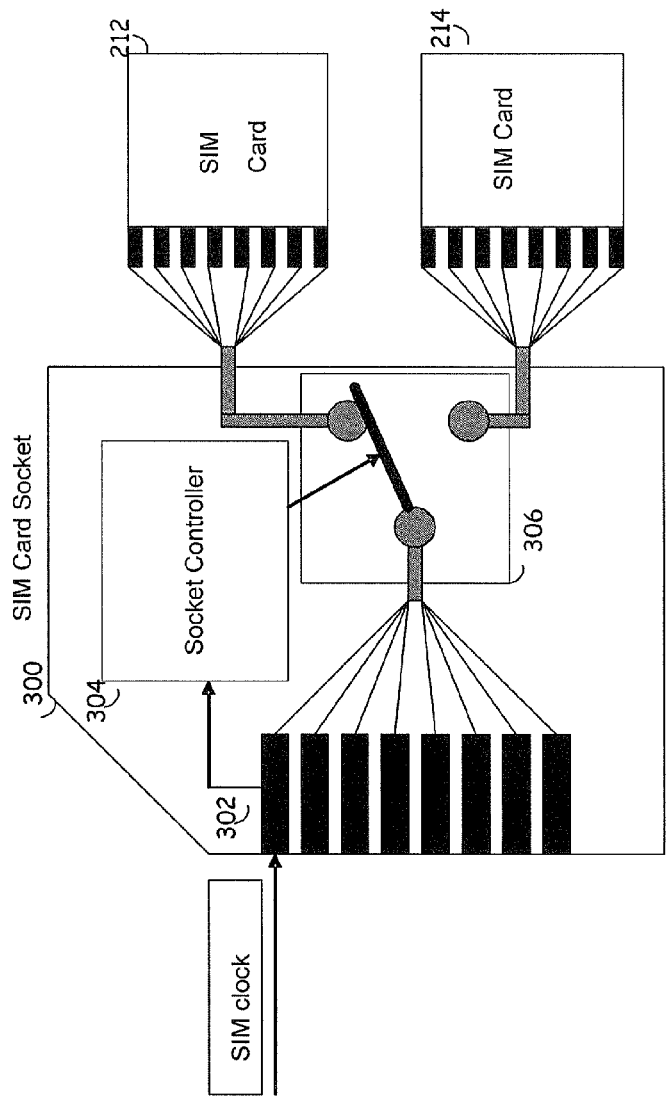
FIG. 3 is a block diagram illustrating an exemplary SIM card socket that connects multiple SIM cards to a multi-SIM multi-standby communication device, in accordance with an embodiment of the invention.

FIG. 3 is a block diagram illustrating an exemplary SIM card socket that connects multiple SIM cards to a multi-SIM multi-standby communication device, in accordance with an embodiment of the invention. Referring to FIG. 3, there is shown a SIM card socket 300. The SIM card socket 300 comprises a socket interface unit 302, a socket controller 304, and a switch 306. The SIM card socket 300 may be connected to multiple SIM cards such as the SIM cards 212-214, respectively.

The socket interface unit 302 may comprise suitable logic, circuitry, interfaces and/or code that may be operable to conduct communication with the processor 206 within the multi-SIM multi-standby communication device 200. The socket interface unit 302 may be operable to receive or detect a SIM clock signal from the processor 206. The detected SIM clock signal may be communicated to the socket controller 304 for further processing. In instances where the detected SIM clock signal indicates that a specific SIM card such as the SIM card 214 is required, the socket interface unit 302 may be connected to the SIM card 214 via the switch 306. A reset signal from the processor 206 may be applied to the SIM card 214 through the socket interface unit 302. An answer to reset (ATR) message from the SIM card 214 may be communicated to the processor 206 via the socket interface unit 302. SIM identification information stored in the SIM card 214 may be communicated to the processor 206 through the socket interface unit 302. The socket interface unit 302 may disconnect the SIM card 214 with the completion of information exchange between the processor 206 and the SIM card 214.

The socket controller 304 may comprise suitable logic, circuitry, interfaces and/or code that may be operable to control and manage operation of the switch 306 to enable connecting to a specific SIM card and switch from one SIM card to another without having to reboot the mobile communication device such as the multi-SIM multi-standby communication device 200. In this regard, the socket controller 304 may be operable to select a SIM card from, for example, the SIM cards 212-214, based on a SIM clock signal detected from the socket interface unit 302. For example, assume that SIM clock signals of $f_1 \in [1\ mHz, 3\ mHz]$ and $f_2 \in [4\ mHz, 5\ mHz]$ may be assigned to the SIM card 212 and the SIM card 214, respectively. In instances where the detected SIM clock signal is below 3 MHz, the socket controller 304 may signal or indicate the switch 306 to connect or switch to the SIM card 212. In instances where the detected SIM clock signal is above 4 MHz but below 5 MHz, the socket controller 304 may signal or indicate the switch 306 to connect or switch to the SIM card 214.

The switch 306 may comprise suitable logic, circuitry, interfaces and/or code that may be operable to connect to a specific SIM card such as the SIM card 212 signaled by the socket controller 310.

In an exemplary operation, the socket interface unit 302 may be operable to detect signals such as a SIM clock signal from the processor 206. The socket controller 304 may select a SIM card such as the SIM card 214 based on the detected SIM clock signal. The socket controller 304 may be operable to signal or notify the switch 306 to enable the connection between the socket interface unit 302 and the SIM card 214. The socket interface unit 302 may be managed by the processor 206 to be connected to the SIM card 214 for SIM identification information. The SIM identification information stored in the SIM card 214 may be communicated to the processor 206 through the socket interface unit 302.

Figure 4:
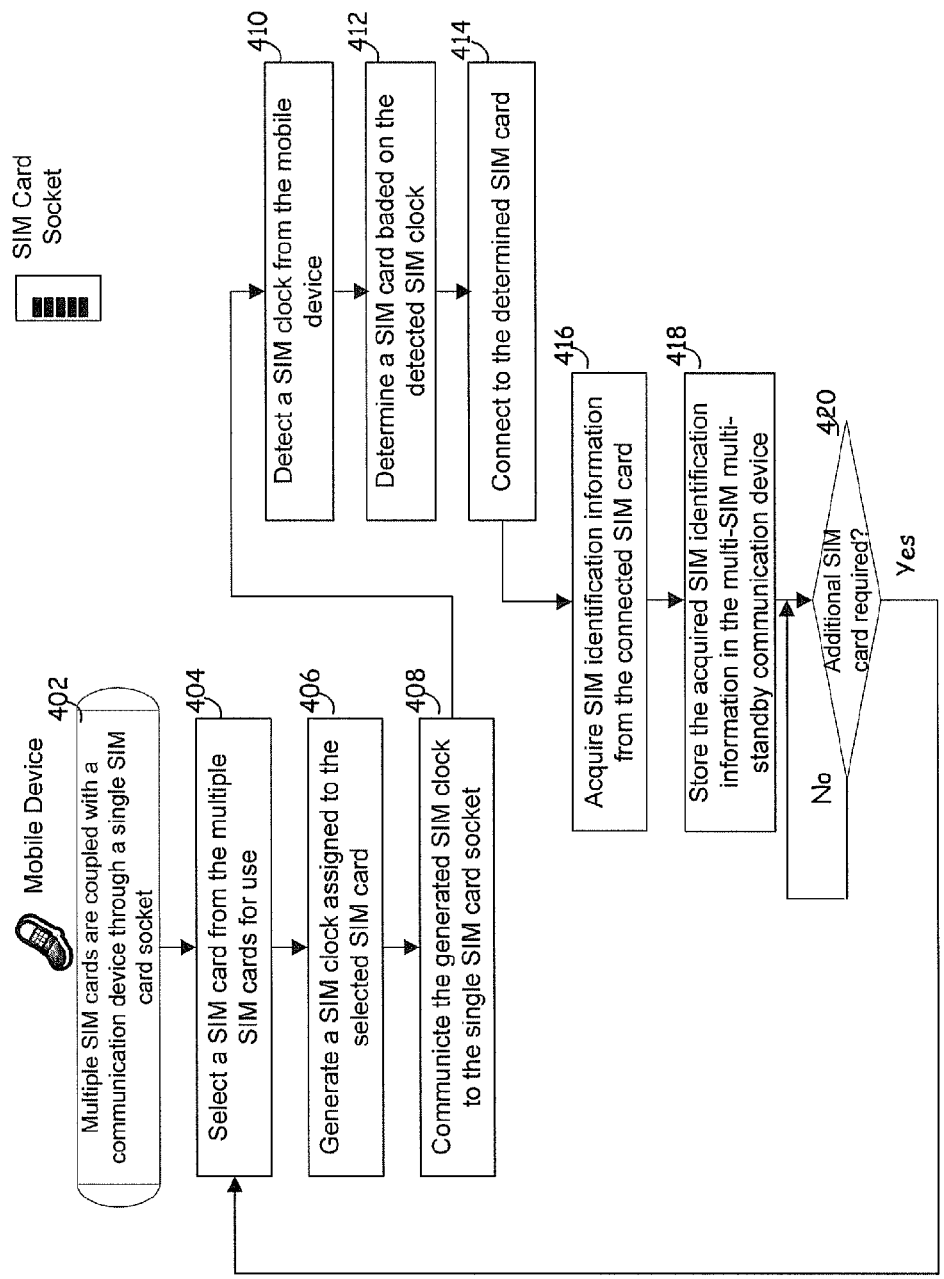
FIG. 4 is a flow chart illustrating exemplary steps for coupling multiple SIM cards via a single SIM card socket in a multi-SIM mobile multi-standby mobile device, in accordance with an embodiment of the invention.

FIG. 4 is a flow chart illustrating exemplary steps for coupling multiple SIM cards via a single SIM card socket in a multi-SIM multi-standby communication device, in accordance with an embodiment of the invention. Referring to FIG. 4, the exemplary steps may start with step 402. In step 402, a mobile device such as the multi-SIM multistandby communication device 200 is coupled with multiple SIM cards such as the SIM cards 212-218 through a single SIM card socket such as the SIM card socket 210. In step 404, a SIM card may be selected from the SIM cards 212-218 based on user preferences and/or device configuration. In step 406, the processor 206 may be operable to generate a SIM clock signal that is initially assigned to the selected SIM card. In step 408, the processor 206 may communicate the generated SIM clock signal to the SIM card socket 210. In step 410, the SIM card socket 208 may be operable to detect a SIM clock signal from the processor 206 of the multi-SIM multi-standby communication device 200.

In step 412, the SIM card socket 208 may be operable to determine a SIM card based on the detected SIM clock signal. In step 414, the SIM card socket 208 may be connected to the determined SIM card through the socket interface unit 302. In step 416, the processor 206 may be operable to acquire SIM identification information from the connected SIM card. In step 418, the acquired SIM identification information may be stored in the SIM database 220*a*. In step 420, it may be determined if an additional SIM card may be required. In instances where an additional SIM card may be required, then the exemplary steps may return to step 404.

In step 420, in instances where an additional SIM card may not be required, then the exemplary steps may stay in step 420.

FIG. 5 is a flow chart illustrating exemplary steps for communicating by a multi-SIM multi-standby communication device that comprise a single SIM card socket that couples multiple SIM cards, in accordance with an embodiment of the invention. Referring to FIG. 5, the exemplary steps may start with step 502. In step 502, a mobile device such as the multi-SIM multi-standby communication device 200 is coupled to multiple SIM cards such as the SIM cards 212-218 through a single SIM card socket such as the SIM card socket 208. In step 504, the multi-SIM multi-standby communication device 200 may be operable to connect to each of the SIM cards 212-218 at a different time instant through the single SIM card socket 208.

In step 506, the multi-SIM multi-standby communication device 200 may be operable to acquire SIM identification information from each connected SIM card over the SIM card socket 208. In step 508, the acquired SIM identification information may be stored in the SIM database 220*a* within the multi-SIM multi-standby communication device 200. In step 510, it may be determined whether the multi-SIM multi-standby communication device is configured to operate in a multi-standby mode. In instances where the multi-SIM multi-standby communication device 200 is configured to operate in a multi-standby mode, then in step 512, the multi-SIM multi-standby communication device 200 may be operable to activate the stored SIM identification information on multiple SIM cards at the same time. In step 514, the multi-SIM multi-standby communication device 200 may utilize the activated SIM identification information corresponding to the multiple SIM cards at the same time. The exemplary steps may end in step 516.

In step 510, in instances where the multi-SIM multi-standby communication device 200 is configured to operate in a single-standby mode, then in step 518. In step 518, the multi-SIM multi-standby communication device 200 may be operable to activate the stored SIM identification information corresponding to one SIM card at a time. In step 520, the multi-SIM multi-standby communication device 200 may be operable to utilize the activated SIM identification information corresponding to one SIM card at the same time without re-booting the multi-SIM multi-standby communication device 200 during SIM card switching. The exemplary steps may end in step 516.

In various exemplary aspects of the method and system for utilizing a single SIM card socket to support multiple SIM cards in a multi-SIM multi-standby communication device, a multiple-subscriber identity module (SIM) mobile communication device such as the multi-SIM multi-standby communication device 200 comprises a single SIM card socket such as the SIM card socket 208 that handles a plurality of SIM cards such as the SIM cards 212-218. Each of the SIM cards 212-218 is associated with a unique SIM clock signal. The multi-SIM multi-standby communication device 200 may be operable to acquire SIM identification information from each of the SIM cards 212-218 utilizing corresponding associated SIM clock signals. The acquired SIM identification information may be utilized by the multi-SIM multi-standby communication device 200 to communicate with one or more communication networks such as the LTE network 140 and the GSM network 150. The SIM cards 212-218 may be selected based on user preferences and/or device configuration. The processor 206 within the multi-SIM multi-standby communication device 200 may be operable to generate each SIM clock signal in response to the SIM card selection. The generated SIM clock signals may be assigned to each of the SIM cards 212-214. Each of assigned SIM clock signals may be signaled to the SIM card socket 300 at a different time instant.

The SIM card socket 300 may be operable to detect each of the signaled SIM clock signals. The socket controller 304 within the SIM card socket 300 may manage and/or control the switch 306 to enable the connection between the SIM card socket 300 and each of the SIM cards 212-218, respectively, based on the corresponding detected SIM clock signals. In this regard, the socket controller 304 may be configured to communicate with the processor 206 to maintain SIM card switching without rebooting the multi-SIM multi-standby communication device 200. The multi-SIM multi-standby communication device 200 may be operable to receive SIM identification information from each SIM card connected to the SIM card socket 300. The received SIM identification information may be stored in the SIM database 220*a* within the multi-SIM multi-standby communication device 200. The stored SIM identification information in the SIM database 220a may be activated to be utilized for concurrent communication with various communication networks such as the LTE network 140 and the GSM network 150 for various network services such as authenticating and/or billing services. In this regard, no device re-booting is performed while activating the stored SIM identification information from one to another of the multiple SIM cards.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing a single SIM card socket to support multiple SIM cards in a multi-SIM multi-standby communication device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication in a multiple-subscriber identity module (multi-SIM) multi-standby communication device comprising a memory and a subscriber identity module (SIM) card socket that is configured to interface with a plurality of SIM cards, the method comprising:
   selecting said plurality of SIM cards based on corresponding frequencies of SIM clock signals utilized by said selected plurality of SIM cards to acquire SIM identification information from each of said plurality of SIM cards via said SIM card socket, said SIM identification information from each of said plurality of SIM cards being associated with one of a plurality of networks;
   storing said acquired SIM identification information from each of said plurality of SIM cards in said memory; and
   communicating with a network of said plurality of networks based on said stored SIM identification information corresponding to said network of said plurality of networks.

2. The method according to claim 1, wherein each of said SIM clock signals is uniquely associated with a single one of said plurality of SIM cards.

3. The method according to claim 2, further comprising: assigning each of said SIM clock signals to a corresponding one of said plurality of SIM cards for respective operations of said plurality of SIM cards.

4. The method according to claim 3, further comprising: signaling said SIM card socket with each of said assigned SIM clock signals at a different time instant.

5. The method according to claim 4, further comprising: connecting said SIM card socket to each of said plurality of SIM cards, respectively, based on a corresponding one of said signaled SIM clock signals.

6. The method according to claim 5, further comprising: receiving said SIM identification information from each of said connected plurality of SIM cards via said SIM card socket.

7. The method according to claim 6, further comprising: activating said received SIM identification information from one to another of said plurality of SIM cards without rebooting said multi-SIM multi-standby communication device.

8. The method according to claim 7, wherein said communicating includes concurrently communicating with said network and one or more other networks of said plurality of networks utilizing said activated SIM identification information.

9. A system for communication, the system comprising:
   one or more processors or circuits for use in a multiple-subscriber identity module (multi-SIM) multi-standby communication device comprising a memory and a subscriber identity module (SIM) card socket configured to interface with a plurality of SIM cards, said one or more processors or circuits being configured to:
   select said plurality of SIM cards based on corresponding frequencies of SIM clock signals utilized by said selected plurality of SIM cards to acquire SIM identification information from each of said plurality of SIM cards via said SIM card socket, said SIM identification information from each of said plurality of SIM cards being associated with one of a plurality of networks;
   store said acquired SIM identification information from each of said plurality of SIM cards in said memory; and
   communicate with a network of said plurality of networks based on said stored SIM identification information corresponding to said network of said plurality of networks.

10. The system according to claim 9, wherein each of said SIM clock signals is uniquely associated with a single one of said plurality of SIM cards.

11. The system according to claim 10, wherein said one or more processors or circuits are further configured to assign each of said SIM clock signals to a corresponding one of said plurality of SIM cards for respective operations of said plurality of SIM cards.

12. The system according to claim 11, wherein said one or more processors or circuits are further configured to signal said SIM card socket with each of said assigned SIM clock signals at a different time instant.

13. The system according to claim 12, wherein said one or more processors or circuits are further configured to connect said SIM card socket to each of said SIM cards, respectively, based on a corresponding one of said signaled plurality of SIM clock signals.

14. The system according to claim 13, wherein said one or more processors or circuits are further configured to receive said SIM identification information from each of said connected plurality of SIM cards via said SIM card socket.

15. The system according to claim 14, wherein said one or more processors or circuits are further configured to activate said received SIM identification information from one to another of said plurality of SIM cards without rebooting said multi-SIM multi-standby communication device.

16. The system according to claim 15, wherein said communicating includes concurrently communicating with said network and one or more other networks of said plurality of networks utilizing said activated SIM identification information.

17. The method according to claim 1, wherein said communicating comprises communicating, to said network, said stored SIM identification information corresponding to said network of said plurality of networks.

18. The method according to claim 1, wherein said SIM identification in is information that identifies the multi-SIM multi-standby communication device to said network of said plurality of networks.

19. The system according to claim 9, wherein said one or more processors or circuits are configured to communicate, to said network, said stored SIM identification information corresponding to said network of said plurality of networks.

20. The system according to claim 9, wherein said SIM identification information is information that identifies the multi-SIM multi-standby communication device to said network of said plurality of networks,

* * * * *

UNITED STATES PATENT AND TRADEMARK OFFICE
CERTIFICATE OF CORRECTION

| | | |
|---|---|---|
| PATENT NO. | : 8,874,168 B2 | Page 1 of 1 |
| APPLICATION NO. | : 12/819039 | |
| DATED | : October 28, 2014 | |
| INVENTOR(S) | : Hui Luo | |

It is certified that error appears in the above-identified patent and that said Letters Patent is hereby corrected as shown below:

In the Claims,

Column 13, line 20, please replace "in" with --information--.

Column 13, line 30, please replace "networks," with --networks.--.

Signed and Sealed this
Seventeenth Day of February, 2015

Michelle K. Lee
*Deputy Director of the United States Patent and Trademark Office*